United States Patent
Yie et al.

(10) Patent No.: US 8,792,740 B2
(45) Date of Patent: Jul. 29, 2014

(54) IMAGE ENCODING/DECODING METHOD FOR RATE-DISTORTION OPTIMIZATION AND APPARATUS FOR PERFORMING SAME

(75) Inventors: Alex Chungku Yie, Incheon (KR); Joon Seong Park, Yongin-si (KR); Ul Ho Lee, Hwaseong-si (KR)

(73) Assignee: Humax Holdings Co., Ltd., Yongin-Si, Gyeonggi-Do (KR)

( * ) Notice: Subject to any disclaimer, the term of this patent is extended or adjusted under 35 U.S.C. 154(b) by 52 days.

(21) Appl. No.: 13/576,598

(22) PCT Filed: Jan. 25, 2011

(86) PCT No.: PCT/KR2011/000499
§ 371 (c)(1),
(2), (4) Date: Aug. 1, 2012

(87) PCT Pub. No.: WO2011/096662
PCT Pub. Date: Aug. 11, 2011

(65) Prior Publication Data
US 2012/0301040 A1   Nov. 29, 2012

(30) Foreign Application Priority Data
Feb. 2, 2010  (KR) .................. 10-2010-0009359

(51) Int. Cl.
*G06K 9/36*    (2006.01)
*G06K 9/46*    (2006.01)

(52) U.S. Cl.
USPC .......................................... 382/238; 382/233

(58) Field of Classification Search
CPC ............. H04N 7/34; H04N 7/44; H04N 7/50; H04N 7/2644
USPC ................ 382/232, 233, 236, 238, 250, 251; 375/240.03, 240.12, 240.14, 240.24, 375/245, E7.075, E7.211, E7.243
See application file for complete search history.

(56) References Cited

U.S. PATENT DOCUMENTS

| | | | |
|---|---|---|---|
| 7,822,116 B2* | 10/2010 | Hinds | 375/240.03 |
| 8,311,109 B2* | 11/2012 | Yu et al. | 375/240.12 |
| 8,582,639 B2* | 11/2013 | He et al. | 375/240 |
| 2001/0017941 A1* | 8/2001 | Chaddha | 382/236 |
| 2004/0252768 A1* | 12/2004 | Suzuki et al. | 375/240.24 |
| 2005/0213835 A1* | 9/2005 | Guangxi et al. | 382/250 |
| 2005/0259730 A1* | 11/2005 | Sun | 375/240.03 |

(Continued)

FOREIGN PATENT DOCUMENTS

| | | | |
|---|---|---|---|
| KR | 10-2004-0073790 A | 8/2004 |
| KR | 10-2006-0109246 A | 10/2006 |
| KR | 10-2007-0119469 A | 12/2007 |
| KR | 10-2008-0026463 A | 3/2008 |

*Primary Examiner* — Amir Alavi
(74) *Attorney, Agent, or Firm* — Lowe Hauptman & Ham, LLP

(57) ABSTRACT

Disclosed are an image encoding/decoding method for rate-distortion optimization and an apparatus for performing the same. A macro block to be encoded is provided, any one of inter-frame prediction and intra-frame prediction is executed to generate a predictive macro block, a residual prediction block is generated on the basis of the generated predictive macro block and the provided macro block, and then the generated residual prediction block is transformed by applying a transform matrix having the highest encoding efficiency among a plurality of predetermined transform matrixes to the generated residual prediction block. Accordingly, it is possible to optimize the rate-distortion, and thus to enhance the quality of an image.

10 Claims, 4 Drawing Sheets

(56) References Cited

U.S. PATENT DOCUMENTS

| | | |
|---|---|---|
| 2006/0098733 A1* | 5/2006 | Matsumura et al. ..... 375/240.03 |
| 2009/0238271 A1* | 9/2009 | Kim et al. ................ 375/240.12 |
| 2012/0201303 A1* | 8/2012 | Yang et al. ............... 375/240.14 |
| 2012/0213278 A1* | 8/2012 | Yasugi et al. ............ 375/240.12 |
| 2012/0301040 A1* | 11/2012 | Yie et al. ........................ 382/233 |
| 2013/0028322 A1* | 1/2013 | Fujibayashi et al. ..... 375/240.12 |

* cited by examiner

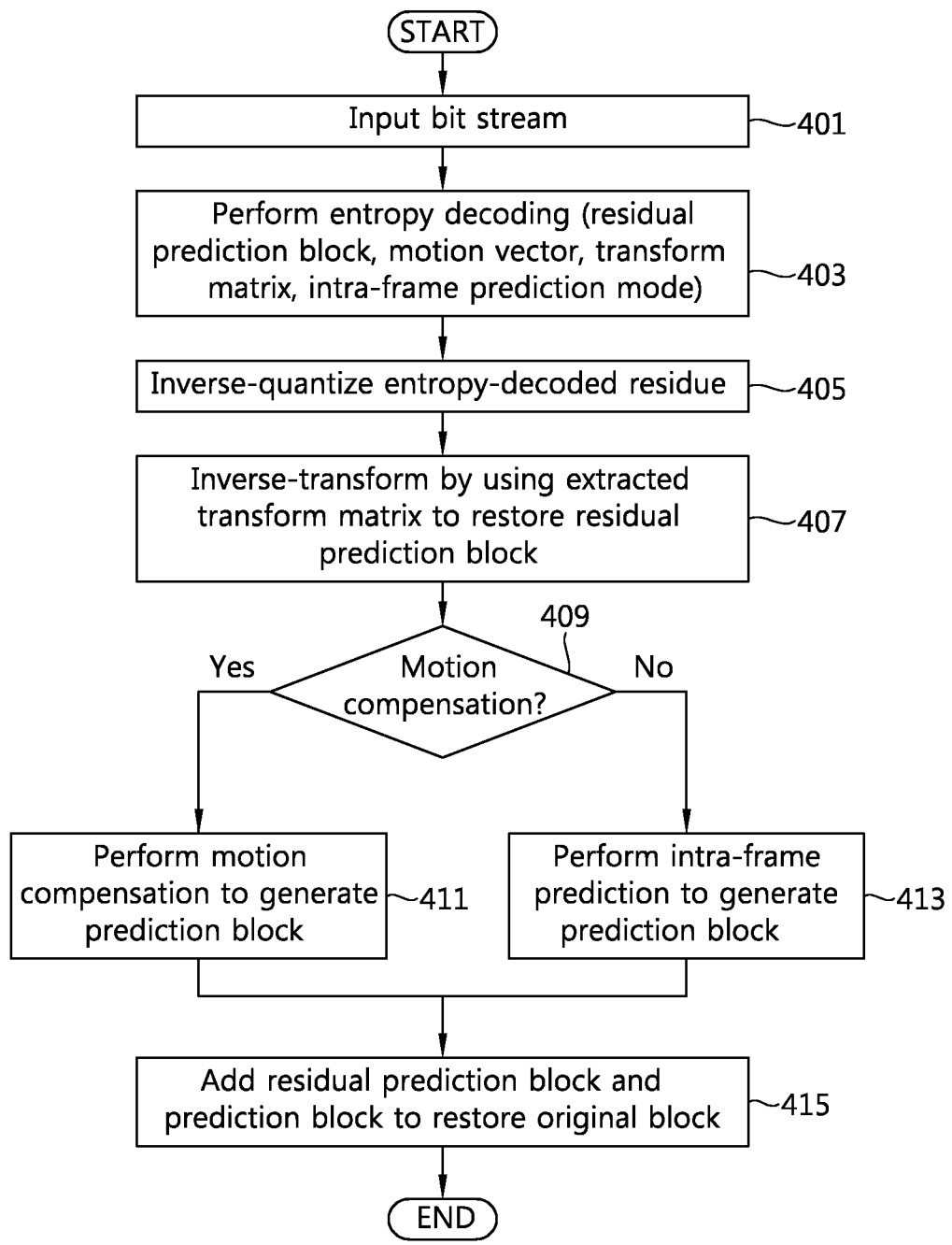

US 8,792,740 B2

IMAGE ENCODING/DECODING METHOD FOR RATE-DISTORTION OPTIMIZATION AND APPARATUS FOR PERFORMING SAME

This application is a 371 of PCT/KR2011/000499 filed on Jan. 25, 2011.

TECHNICAL FIELD

The present invention is directed to encoding and decoding of an image, and more specifically to an image encoding/decoding method for rate-distortion optimization and an apparatus for performing the same.

BACKGROUND ART

In a general image compressing method, encoding is performed with one picture separated into a plurality of blocks each having a predetermined size. Further, to raise compression efficiency, inter-frame prediction and intra-frame prediction technologies are used that eliminate redundancy between pictures.

An inter-frame prediction-based image encoding method compresses images by removing spatial redundancy between pictures, and a representative example thereof is a motion compensating prediction encoding method.

The motion compensating prediction encoding searches for a region similar to a block being currently encoded in at least one reference picture positioned before and/or behind a picture being currently encoded to thereby generate a motion vector and uses the generated motion vector to perform motion compensation, thereby obtaining a prediction block. Then, the residue of the current block and the prediction block undergoes DCT (Discrete Cosine current block and the prediction block undergoes DCT (Discrete Cosine Transform), quantization, and entropy encoding, and is then transmitted.

In general, a macro block of various sizes, such as 16×16, 8×16, and 8×8 pixels, is used for motion compensating prediction, and a block whose size is 8×8 or 4×4 pixels is used for transform and quantization.

Intra-frame prediction is a method of compressing images by removing spatial redundancy using pixel correlation between blocks in one picture, and this method generates a prediction value of a current block to be encoded from the current block and encoded pixels adjacent to the current block and then compresses the residue of the pixels of the current block and the generated prediction value. In H.264/AVC, the size of a block used for intra-frame prediction is 4×4, 8×8, or 16×16 and each of blocks having a size of 4×4 or 8×8 pixels is subjected to intra-frame prediction using 9 intra-frame prediction modes, and blocks having a size of 16×16 pixels are subjected to intra-frame prediction using 4 intra-frame prediction modes.

As described above, the residue generated by intra-frame prediction undergoes transform and quantization.

However, the conventional transforming methods do not consider characteristics of each block and cannot maximize transforming performance in terms of rate-distortion.

DISCLOSURE

Technical Problem

An object of the present invention is to provide an image encoding and decoding method for rate-distortion optimization that may maximize transforming performance.

Another object of the present invention is to provide an image encoding apparatus and an image decoding apparatus that perform the above-mentioned transforming method.

Technical Solution

An image encoding method according to an aspect of the present invention to achieve the objects of the present invention includes the steps of receiving a coding unit to be encoded, performing one of inter-frame prediction and intra-frame prediction on the coding unit to generate a prediction block, generating a residual prediction block based on the generated prediction block and the coding unit, and applying a transform matrix having highest encoding efficiency among a plurality of predetermined transform matrixes to the generated residual prediction block to transform the residual prediction block.

An image decoding method of decoding an encoded bit stream by applying a transform matrix having highest encoding efficiency among a plurality of predetermined transform matrixes to a residual prediction block according to an aspect of the present invention to achieve the objects of the present invention includes the steps of entropy-decoding the bit stream to extract at least one of motion vector information, a quantized residual prediction block information, motion vector information, intra-frame prediction mode information, and transform matrix information, inverse-quantizing the quantized residual prediction block, inverse-transforming the inverse-quantized residual prediction block by applying the transform matrix to reconstruct the residual prediction block, performing one of motion compensation and intra-frame prediction to generate a prediction block, and adding the reconstructed residual prediction block and the generated prediction block to reconstruct an original coding unit.

Advantageous Effects

According to the above-described image encoding/decoding method for rate-distortion optimization and the apparatus performing the same, a plurality of predetermined transform matrixes all apply to the residual prediction block generated through intra-frame prediction or inter-frame prediction corresponding to the size of the block to be transformed so as to perform transform, and then, the residual prediction block is transformed by applying a transform matrix having highest encoding efficiency, thus optimizing rate-distortion as well as increasing image quality.

DESCRIPTION OF DRAWINGS

FIG. 4 is a flowchart illustrating an image decoding method using weighted prediction according to an embodiment of the present invention.

BEST MODE

Figure 1:
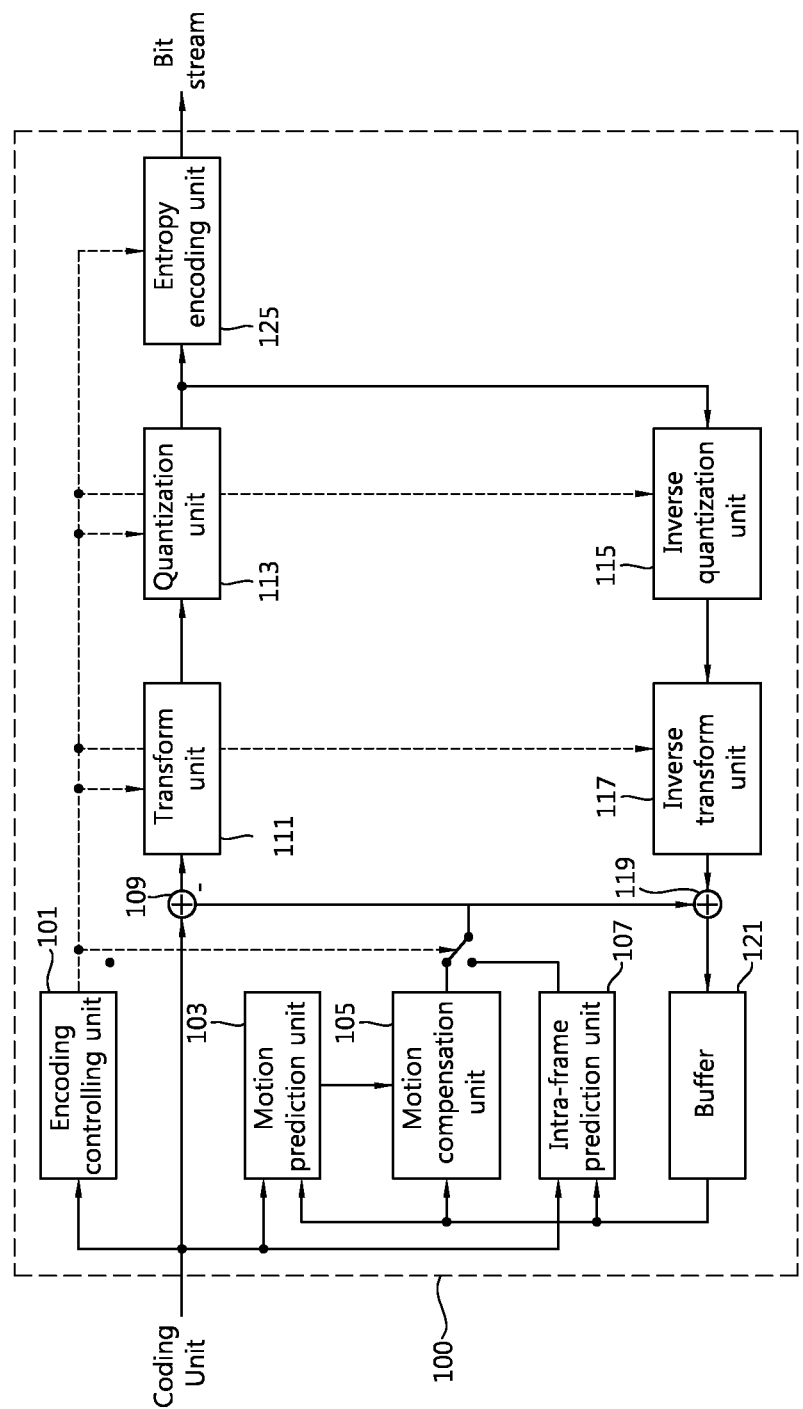
FIG. 1 is a block diagram illustrating a configuration of an image encoding apparatus using weighted prediction according to an embodiment of the present invention.

Various modifications and variations may be made to the present invention. Hereinafter, some particular embodiments will be described in detail with reference to the accompanying drawings.

However, it should be understood that the present invention is not limited to the embodiments and all the variations or replacements of the invention or their equivalents are included in the technical spirit and scope of the present invention.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings, wherein the same reference numerals may be used to denote the same or substantially the same elements throughout the specification and the drawings, and description on the same elements will be not repeated.

The residue generated through intra-frame prediction undergoes transform and quantization, and in the transforming process, transform is performed by equally applying one transform matrix to all the blocks or by applying a predetermined transform matrix corresponding to a selected intra-frame prediction mode.

For example, to reduce the residue generated through intra-frame prediction, in case of MDDT (Mode-Dependent Directional Transform), with respect to the residue (i.e., prediction error block) generated after intra-frame prediction is performed, energy of the prediction error block is compressed in the frequency domain by using a basis vector designed based on KLT (Karhunen-Loeve Transform) according to directivity of the intra-frame prediction method. Since the MDDT technology applies transform encoding according to an intra-frame prediction mode, characteristics of quantized transform coefficients generated after quantization may also have different forms depending on directivity, and adaptive scanning is used to efficiently encode the coefficients.

Hereinafter, in the embodiments of the present invention, the extended macro block refers to a block having a size of 32×32 pixels or 64×64 pixels or more.

FIG. 1 is a block diagram illustrating a configuration of an image encoding apparatus according to an embodiment of the present invention.

Referring to FIG. 1, the encoding apparatus 100 according to an embodiment of the present invention includes an encoding controlling unit 101, a motion prediction unit 103, a motion compensation unit 105, an intra-frame prediction unit 107, a first adder 109, a transform unit 111, a quantization unit 113, an inverse quantization unit 115, an inverse transform unit 117, a second adder 119, a buffer 121, and an entropy encoding unit 125.

The encoding controlling unit 101 determines an encoding mode of an input coding unit as one of an inter-frame prediction mode and an intra-frame prediction mode and connects one of the motion compensation unit 105 and the intra-frame prediction unit 107 to the first adder 109 and the second adder 119 based on the determined encoding mode. Further, the encoding controlling unit 101 provides the entropy encoding unit 125 with overhead information associated with encoding including a transform matrix used for transform and controls the components included in the encoding apparatus.

Here, the input coding unit may have a square shape and each coding unit may have a variable size, such as 2N×2N (unit: pixel). The inter-frame prediction, intra-frame prediction, transform, quantization, and entropy encoding may be performed on a per-coding unit basis. The coding unit may include a largest coding unit (LCU) and a smallest coding unit (SCU), and the largest coding unit (LCU) and the smallest coding unit (SCU) may have a size which may be represented as powers of two, which are 8 or more. For example, the input coding unit may be an extended macro block that has a size of 16×16 pixels or less or 32×32 pixels or 64×64 pixels or more. The extended macro block may have a size of 32×32 pixels or more, i.e., 64×64 pixels, 128×128 pixels or more so that it is appropriate for high-resolution images having an ultra HD (High Definition) or higher resolution. The extended macro block may be limited as having a size of maximally 64×64 pixels or less in consideration of complexity of the encoder and decoder in case of high-resolution images having an ultra HD (High Definition) or higher resolution.

The coding unit may have a recursive tree structure. The recursive structure may be represented through a series of flags. For example, in the case that the coding unit CUk whose hierarchical level or hierarchical depth is k has a flag value of 0, coding on the coding unit CUk is performed on the current hierarchical level or hierarchical depth, and in the case that the flag value is 1, the coding unit CUk whose current hierarchical level or hierarchical depth is k is split into four independent coding units CUk+1, the hierarchical level or hierarchical depth of the split coding units CUk+1 becomes k+1, and the size thereof becomes Nk+1×Nk+1. In such case, the coding unit CUk+1 may be represented as the sub coding unit of the coding unit CUk. The coding unit CUk+1 may be recursively processed until the hierarchical level or hierarchical depth of the coding unit CUk+1 reaches the maximally allowable hierarchical level or hierarchical depth. In the case that the hierarchical level or hierarchical depth of the coding unit CUk+1 is the same as the maximally allowable hierarchical level or hierarchical depth, no more splitting is allowed.

The size of the largest coding unit (LCU) and the size of the smallest coding unit (SCU) may be included in a sequence parameter set (SPS). The sequence parameter set (SPS) may include the maximally allowable hierarchical level or hierarchical depth of the largest coding unit (LCU). For example, the maximally allowable hierarchical level or hierarchical depth is 5, and in the case that the size of a side of the largest coding unit (LCU) is 128 (unit: pixels), five types of coding unit sizes, such as 128×128 (LCU), 64×64, 32×32, 16×16, and 8×8 (SCU), are available. That is, if the size and maximally allowable hierarchical level or hierarchical depth of the largest coding unit (LCU) are given, the allowable size of the coding unit may be determined.

The size of the coding unit may be limited to maximally 64×64 pixels or less in consideration of complexity of the encoder and decoder in case of high-resolution images having an ultra HD (High Definition) or higher resolution.

The use of the above-described recursive coding unit structure according to an embodiment of the present invention provides the following advantages.

First, a larger size than the size of the existing 16×16 macro block may be supported. If an image region of interest is homogeneous, the largest coding unit (LCU) may display the image region of interest with a smaller number of symbols than when a number of smaller blocks are used.

Second, compared with when a fixed size of macro blocks is used, the largest coding unit (LCU) having various sizes may be supported, so that a codec may be easily optimized for various contents, applications, and devices. That is, the size and the largest hierarchical level or largest hierarchical depth of the largest coding unit (LCU) may be properly selected, so that the hierarchical block structure may be further optimized for a target application.

Third, without discerning the macro block, sub-macro block, and extended macro block, one single unit form, coding unit LCT, is used to be able to very simply represent the multi-level hierarchical structure by using the largest coding unit (LCT) size, the largest hierarchical level (or largest hierarchical depth) and a series of flags. When the size-independent syntax representation is used together, it is enough to specify a syntax item having a generalized size for the remaining coding tools, and this consistency helps simplify the actual parsing process. The maximum value of the hierarchical level (or the largest hierarchical depth) may be an arbitrary value, and may be larger than a value allowed by the existing H.264/AVC encoding scheme. All the syntax elements may be specified by a consistent method independent from the size of the coding unit CU by using the size-independent syntax representation. The splitting process on the coding unit CU may be recursively specified, and other syntax elements on the leaf coding unit—last coding unit of the hierarchical level—may be defined to have the same size irrespective of the coding unit size. The above-described method is very effective in reducing parsing complexity and may increase the clarity of representation when a large hierarchical level or hierarchical depth.

If the above-mentioned hierarchical splitting process is done, inter or intra-frame prediction may be performed on the leaf node in the coding unit hierarchical tree without further splitting, and this leaf coding unit is used as a prediction unit (PU) which is a basic unit for inter or intra-frame prediction.

Partitioning is performed on the leaf coding unit so as to do intra or inter-frame prediction. Partitioning is conducted on the prediction unit (PU). Here, the prediction unit (PU) means a basic unit for inter or intra-frame prediction, and as the prediction unit (PU), the existing macro block unit or sub-macro block unit, or a coding unit basis or an extended macro block unit having a size of 32×32 pixels or more may be used.

The partitioning for the inter-frame prediction or intra-frame prediction may be performed as asymmetric partitioning or geometrical partitioning having any shape other than square, or as partitioning along an edge direction.

Referring back to FIG. 1, the motion prediction unit 103 performs inter-frame prediction based on a plurality of reference pictures that have been reconstructed and stored in the buffer 121 and the input coding unit to thereby generate a motion vector. Here, the generated motion vector is provided to the motion compensation unit 105 and the entropy encoding unit 125.

The motion compensation unit 105 applies the motion vector provided from the motion prediction unit 103 to the reference block of the corresponding reference picture stored in the buffer 121 to thereby generate a motion-compensated prediction block.

The intra-frame prediction unit 107 generates a prediction value of the current block from encoded pixels adjacent to the input coding unit. Here, the intra-frame prediction unit 107 may separate the input coding unit into blocks having a size of 4×4, 8×8, or 16×16 pixels, generate prediction blocks from pixels adjacent to each separated block, upon performing intra-frame prediction on the block having a size of 4×4 pixels or 8×8 pixels, perform inter-frame prediction through application of one of nine intra-frame prediction modes defined in H.264//AVC, and perform inter-frame prediction on the block having a size of 16×16 pixels through application of one of four intra-frame prediction modes.

In the decoding apparatus 100 according to an embodiment of the present invention, with respect to the inter-frame prediction through the motion prediction unit 103 and the motion compensation unit 105 and the intra-frame prediction through the intra-frame prediction unit 107, any one prediction mode only may be performed according to control of the encoding controlling unit 101, and in the case that one of the inter-frame prediction and intra-frame prediction is selected, the encoding controlling unit 101 switches a connection path so that among the output of the motion compensation unit 105 and the output of the intra-frame prediction unit 107, one corresponding to the selected prediction mode may be provided to the first adder 109 and the second adder 119.

When inter-frame prediction encoding is performed, the first adder 109 operates the input coding unit and the prediction block provided from the motion compensation unit 105 to generate a residue (or residual prediction block), and when intra-frame prediction encoding is performed, operates the input coding unit and the prediction block provided from the intra-frame prediction unit 107 to generate a residue.

The transform unit 111 performs transform by using one of plural predetermined transform matrixes in consideration of the encoding efficiency and the size of each residual prediction block that undergoes transform with respect to the residual prediction block (i.e., residue) provided from the first adder 109.

Specifically, in the case that intra-frame prediction encoding is performed and the size of the block to be transformed is 4×4 pixels or 8×8 pixels, a predetermined number (e.g., 9) of transform matrixes apply to each transform block and encoding is then performed by application of a transform matrix having the highest encoding efficiency, and in the case that intra-frame prediction encoding is performed and the size of the block to be transformed is 16×16 pixels, a predetermined number (e.g., 4) of transform matrixes apply to each transform block and encoding is then performed by application of a transform matrix having the highest encoding efficiency. Here, as the predetermined number of transform matrixes, transform matrixes defined in MDDT (Mode Dependent Directional Transform) may be used.

MDDT applies the transform along an intra coding-specific direction—for example, intra mode (or intra coding) direction used for encoding. For example, in the case that the 4×4 block is intra coded by a horizontal direction mode among the nine intra modes, transform may be performed along the horizontal direction.

The size of the transformed block may be 4×4 blocks, 8×8 blocks, 16×16 blocks, or 32×32 blocks.

The block used for transform may be implemented as a transform unit (TU), and the transform unit may have a recursive tree structure. For example, the transform unit may have a 2-level tree structure. For example, in the case that the transform unit whose hierarchical level or hierarchical depth is k has a flag value of 0, transform on the transform unit is performed with respect to the current hierarchical level or hierarchical depth, and in the case that the flag value is 1, it is split into four independent coding units CUk+1, and the split coding units CUk+1 have the hierarchical level or hierarchical depth of k+1, and the size may be Nk+1×Nk+1.

Or, even in the case that inter-frame prediction encoding is performed and the size of the block to be transformed is 32×32 pixels or more, the transform unit 111 applies all of the predetermined number of transform matrixes corresponding to the inter-frame prediction encoding and then performs encoding by application of the transform matrix having the highest encoding efficiency.

As described above, among the plurality of transform matrixes, information on the transform matrix used for transform is provided to the entropy encoding unit 125 and subjected to entropy encoding and is then provided to the decoding apparatus for decoding.

The quantization unit 113 quantizes transformed data provided from the transform unit 111 and then provides the quantized data to the inverse quantization unit 115 and the entropy encoding unit 125.

The inverse quantization unit 115 inverse-quantizes the quantized data provided from the quantization unit 113 and then provides the result to the inverse transform unit 117, and the inverse transform unit 117 inverse-transforms the inverse-quantized data by using the transform matrix information used for transform by the transform unit 111 to thereby reconstruct the residual prediction block and then provides the reconstructed residual prediction block to the second adder 119.

The second adder 119 adds the prediction block provided from the motion compensation unit 105 or the intra-frame prediction unit 107 and the prediction block provided from the inverse transform unit 117 to thereby reconstruct the coding unit and then stores it in the buffer 121.

The buffer 121 may store pictures which are a set of the reconstructed coding units, and the plurality of pictures stored in the buffer 121 are used for reference pictures for motion compensation and prediction.

The entropy encoding unit 125 entropy-encodes the quantized residual prediction block, the motion vector information used for inter-frame prediction, the prediction mode information used for intra-frame prediction, and the transform matrix information used for transform to thereby generate a bit stream.

Figure 2:
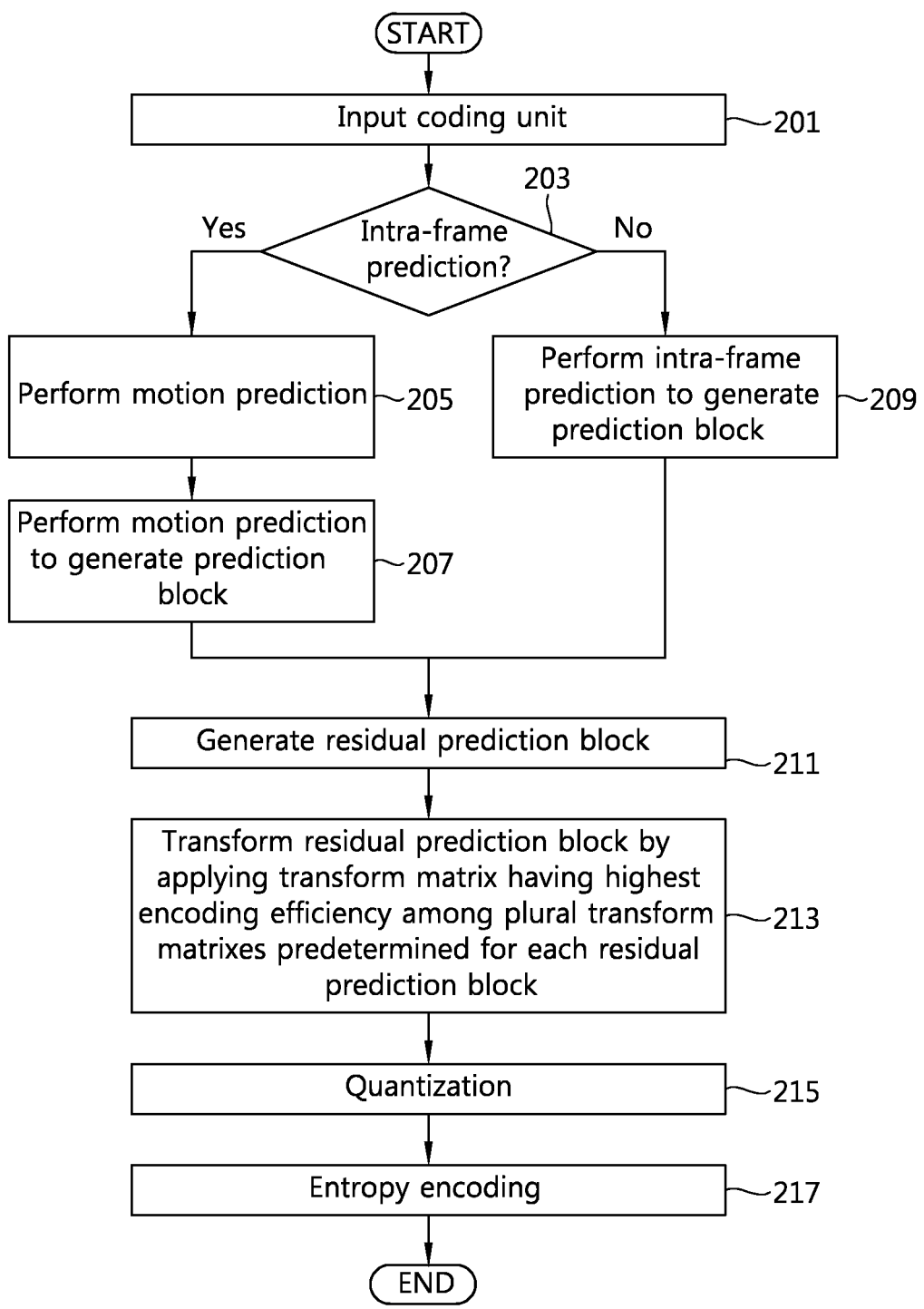
FIG. 2 is a flowchart illustrating an image encoding method using weighted prediction according to an embodiment of the present invention.

FIG. 2 is a flowchart illustrating an image encoding method using block merging according to an embodiment of the present invention.

Referring to FIG. 2, if a coding unit is input to the encoding apparatus (step 201), the encoding apparatus selects a prediction encoding mode between the inter-frame prediction and the intra-frame prediction (step 203). The input coding unit has a size of 16×16 pixels or less or may be an extended macro block having a size of 32×32 pixels or 64×64 pixels or more. The input coding unit may have the above-described recursive coding unit structure.

Upon performing the inter-frame prediction, motion prediction is performed based on the plural reference pictures that have been reconstructed and stored in the buffer and the input coding unit to thereby generate a motion vector (step 205) and uses the generated motion vector to perform motion compensation, thereby generating a prediction block corresponding to the current block (step 207).

Or, upon performing the intra-frame prediction, the prediction value of the current block is generated from the encoded pixels adjacent to the input coding unit (step 209). Here, the intra-frame prediction may separate the input coding unit into the blocks having a size of 4×4, 8×8 or 16×16 pixels and applies intra-frame prediction mode to pixels adjacent to each of the separated blocks, thereby generating a prediction block. In the case that intra-frame prediction is performed on the block having a size of 4×4 or 8×8 pixels, intra-frame prediction may be performed by application of one of nine intra-frame prediction modes defined in H.264/AVC, and one of four intra-frame prediction modes may apply to the block having a size 16×16 pixels to perform intra-frame prediction.

Thereafter, the encoding apparatus operates the prediction block generated through the intra-frame prediction or inter-frame prediction and the input coding unit to thereby generate a residual prediction block (step 211).

Then, the encoding apparatus performs transform by using one of plural transform matrixes predetermined in consideration of encoding efficiency and the size of the residual prediction block with respect to the generated residual prediction block (step 213). That is, in the case that intra-frame prediction is performed and the size of the transformed block is 4×4 pixels or 8×8 pixels, all of the predetermined number (e.g., 9) of transform matrixes apply to each transform block and then performs encoding by application of the transform matrix having the highest encoding efficiency, and in the case that intra-frame prediction encoding is performed and the size of the transformed block is 16×16 pixels, all of the predetermined number (e.g., 4) of transform matrixes apply to each transform block and performs encoding by application of the transform matrix having the highest encoding efficiency. Here, as the predetermined number of transform matrixes, transform matrixes defined in MDDT may be used.

Or, in the case that inter-frame prediction is performed and the size of the transformed block is 32×32 pixels, the encoding apparatus may apply all of the predetermined number of transform matrixes corresponding to the inter-frame prediction encoding and then may perform encoding by application of the transform matrix having the highest encoding efficiency.

Thereafter, the encoding apparatus quantizes the transformed data (step 215) and entropy-encodes the quantized data to thereby generate a bit stream (step 217). Here, the entropy-encoded information may include the quantized residual prediction block, the motion vector information used for inter-frame prediction, the prediction mode information used for intra-frame prediction, and the transform matrix information used for transform.

In the encoding method according to an embodiment of the present invention as illustrated in FIGS. 1 and 2, transform is performed by applying all of the plural transform matrixes corresponding to the size of the transformed block to the residual prediction block generated through inter-frame prediction or intra-frame prediction, and the residual prediction block is transformed by application of the transform matrix having the highest encoding efficiency, thereby increasing encoding efficiency.

Figure 3:
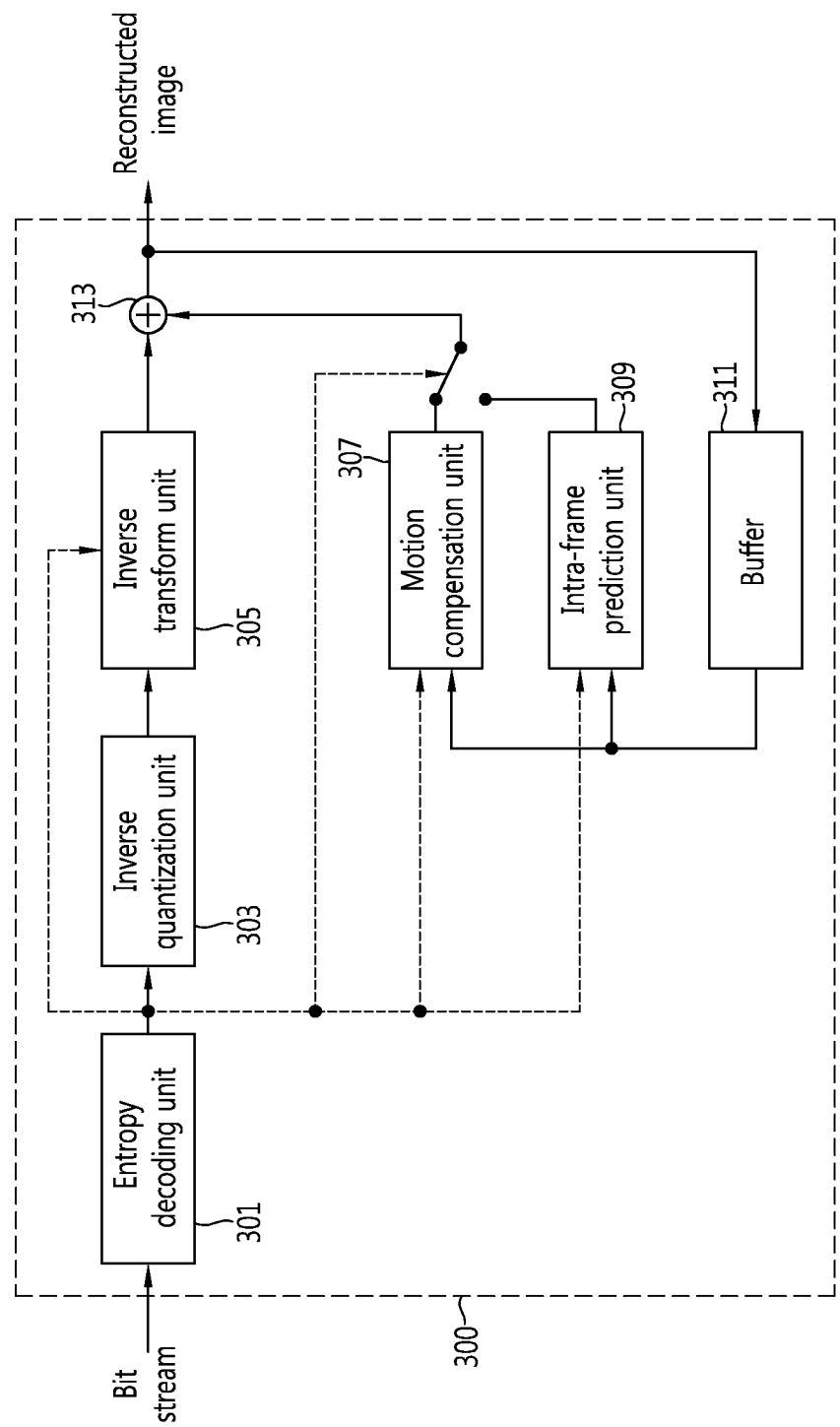
FIG. 3 is a block diagram illustrating a configuration of an image decoding apparatus using weighted prediction according to an embodiment of the present invention.

FIG. 3 is a block diagram illustrating a configuration of a decoding apparatus according to an embodiment of the present invention. FIG. 3 illustrates a configuration of the decoding apparatus that decodes an image encoded by the encoding apparatus shown in FIG. 1.

Referring to FIG. 3, the decoding apparatus 300 according to an embodiment of the present invention includes an entropy decoding unit 301, an inverse quantization unit 303, an inverse transform unit 305, a motion compensation unit 307, an intra-frame prediction unit 309, a buffer 311, and a third adder 313.

The entropy decoding unit 301 entropy-decodes the bit stream provided from the decoding apparatus and extracts the quantized residual prediction block, the motion vector used for inter-frame prediction, the prediction mode information used for intra-frame prediction, and the transform matrix used for transform.

The inverse quantization unit 303 inverse-quantizes the quantized residual prediction block provided from the entropy decoding unit 301, and the inverse transform unit 305 inverse-transforms the data provided from the inverse quantization unit 303. Here, the inverse transform unit 305 performs inverse transform based on the transform matrix information provided from the entropy decoding unit 301 to thereby reconstruct the residual prediction block.

The motion compensation unit 307 applies the motion vector provided from the entropy decoding unit 301 to the reference block of the reference picture stored in the buffer 311 to thereby generate a prediction block.

The intra-frame prediction unit 309 generates the prediction value of the current block from pixels adjacent to the block to be currently decoded based on the intra-frame prediction mode provided from the entropy decoding unit 301. Here, the intra-frame prediction unit 309 divides the block to be currently decoded into blocks having a size of 4×4, 8×8, or 16×16 pixels and uses the intra-frame prediction mode information to be able to generate the prediction block from pixels adjacent to each divided block.

In the decoding apparatus 300 according to an embodiment of the present invention, only one of the prediction blocks generated through the motion compensation unit 307 and the intra-frame prediction unit 309 may be generated based on the selection information extracted from the entropy decoding unit 301, and only one of the motion compensation unit 307 and the intra-frame prediction unit 309 may be connected to the third adder 313 through path switching. That is, in the decoding apparatus 300, only one of the inter-frame prediction and intra-frame prediction may be performed corresponding to the encoding mode performed in the encoding apparatus.

The reconstructed image is stored in the buffer 311 and used as the reference picture.

The third adder 313 adds the prediction block provided from the motion compensation unit 307 or the intra-frame prediction unit 309 and the residual prediction block provided from the inverse transform unit 305 to thereby reconstruct the original block.

FIG. 4 is a flowchart illustrating an image decoding method according to an embodiment of the present invention.

Referring to FIG. 4, if the encoded bit stream is input from the encoding apparatus (step 401), the decoding apparatus entropy-quantizes the bit stream to thereby extract the quantized residual prediction block information, motion vector information, transform matrix information, and intra-frame prediction mode information (step 403). Here, the intra-frame prediction mode may be extracted only when the encoding apparatus has performed the intra-frame prediction, and the entropy-decoded data may include encoding mode information (inter-frame prediction or intra-frame prediction).

Thereafter, the decoding apparatus inverse-quantizes the entropy-decoded residue (step 405) and uses the extracted transform matrix information to inverse-transform the inverse-quantized data, thereby reconstructing the residual prediction block (step 407).

Further, the decoding apparatus determines a decoding mode based on the encoding mode included in the entropy-decoded information (step 409), and when the decoding mode is determined as motion compensation, performs motion compensation by using the motion vector, thereby generating the prediction block (step 411).

Or, when the decoding mode is determined as intra-frame prediction, the decoding apparatus applies the extracted intra-frame prediction mode to pixels adjacent to the current block to be decoded to thereby generate the prediction block (step 413).

Thereafter, the decoding apparatus adds the reconstructed residual prediction block and the prediction block generated in step 411 or 413 to thereby reconstruct the original block, i.e., the coding unit (step 415).

Although the embodiments of the invention have been described, it will be understood by those skilled in the art that various variations and modifications may be made to the embodiments without departing from the spirit and scope of the invention claimed in the claims.

The invention claimed is:

1. An image encoding method comprising the steps of:
receiving a coding unit to be encoded;
performing one of inter-frame prediction and intra-frame prediction on the coding unit to generate a prediction block;
generating a residual prediction block based on the generated prediction block and the coding unit; and
applying one transform matrix among a plurality of predetermined transform matrixes to the generated residual prediction block to transform the residual prediction block,
wherein the step of applying one transform matrix among a plurality of predetermined transform matrixes to the generated residual prediction block to transform the residual prediction block includes, in a case where the intra-frame prediction is performed and the transformed residual prediction block has a size of 4×4 or 8×8 pixels, applying all of 9 transform matrixes to each residual prediction block and then transforming the residual prediction block by applying the one transform matrix among the plurality of predetermined transform matrixes.

2. The image encoding method of claim 1, wherein the step of applying one transform matrix among a plurality of predetermined transform matrixes to the generated residual prediction block to transform the residual prediction block includes, in a case where the intra-frame prediction is performed and the transformed residual prediction block has a size of 16×16 pixels, applying all of 4 transform matrixes to each residual prediction block and then transforming the residual prediction block by applying the one transform matrix among the plurality of predetermined transform matrixes.

3. The image encoding method of claim 1, wherein the step of applying one transform matrix among a plurality of predetermined transform matrixes to the generated residual prediction block to transform the residual prediction block includes performing transform by using the one transform matrix which is predetermined along a specific direction of the intra-frame prediction.

4. The image encoding method of claim 1, wherein the step of applying one transform matrix among a plurality of predetermined transform matrixes to the generated residual prediction block to transform the residual prediction block includes, in a case where the residual prediction block has a size of 4×4 pixels and among 9 intra-frame prediction modes, intra-frame prediction is performed in a horizontal direction mode, performing transform by using the plurality of predetermined transform matrixes along the horizontal direction.

5. The image encoding method of claim 1, wherein the residual prediction block used for the transform is implemented as a transform unit (TU), and the transform unit has a recursive tree structure.

6. An image decoding method of decoding an encoded bit stream by applying a transform matrix among a plurality of predetermined transform matrixes to a residual prediction block, the image decoding method comprising the steps of:
    entropy-decoding the bit stream to extract at least one of motion vector information, a quantized residual prediction block information, intra-frame prediction mode information, and transform matrix information;
    inverse-quantizing the quantized residual prediction block;
    inverse-transforming the inverse-quantized residual prediction block by applying the transform matrix to reconstruct the residual prediction block;
    performing one of motion compensation and intra-frame prediction to generate a prediction block; and
    adding the reconstructed residual prediction block and the generated prediction block to reconstruct an original coding unit.

7. The image decoding method of claim 6, wherein in case the intra-frame prediction is performed, the transform matrix is determined based on a size of the residual prediction block.

8. The image decoding method of claim 6, wherein the step of inverse-transforming the inverse-quantized residual prediction block by applying the transform matrix to reconstruct the residual prediction block includes performing inverse-transform by using the transform matrix only in case a size of the residual prediction block is 4×4.

9. The image decoding method of claim 6, wherein the step of inverse-transforming the inverse-quantized residual prediction block by applying the transform matrix to reconstruct the residual prediction block includes, in a case where the residual prediction block has a size of 4×4 pixels, and among 9 intra-frame prediction modes, a horizontal direction mode is used to perform the intra-frame prediction, inverse-transform is performed by using the transform matrix along the horizontal direction.

10. The image decoding method of claim 6, wherein the residual prediction block used for the transform is implemented as a transform unit (TU), and the transform unit has a recursive tree structure.

\* \* \* \* \*